3,167,491
POLYFLUORINATED ETHYLENE POLYMER-METAL ARTICLE AND METHOD

Harvey M. Harrison, New Rochelle, and George F. Herrmann, Brooklyn, N.Y., assignors to Plasitron Corporation, New York, N.Y., a corporation of Delaware
No Drawing. Filed July 29, 1960, Ser. No. 46,099
6 Claims. (Cl. 204—30)

This invention relates to a polyfluorinated ethylene polymer article with a layer of metal of substantial thickness directly bonded to a surface thereof, the composite article having substantially uniform electrical properties. The metal layer is in intimate contact with the surface of the polymer, and the bond is free of any intermediate adhesive material. The invention also relates to a method for bonding metal directly to the surface of a polyfluorinated ethylene polymer article, and more particularly to a method for achieving a direct metal to polymer bond. It is particularly related to a method for directly bonding a layer of metal of substantial thickness to the surface of a polytetrafluoroethylene article.

The polymers with which the present invention is concerned are polymers of fluorinated ethylene and copolymers of fluorinated ethylene with ethylenically unsaturated monomers. For example a preferred polymer is polytetrafluoroethylene, although polychlorotrifluoroethylene and polyvinylidene fluoride are also in this category. Examples of copolymers include tetrafluoroethylene with chlorotrifluoroethylene or with hexafluorpropylene, and similar monomers. Polytetrafluoroethylene is a very important polymer at the present time, and the present invention will for the most part be described with reference to this material.

It is well known that the polyfluorinated ethylene polymers are extremely stable over a wide temperature range, and polytetrafluoroethylene has excellent dielectric characteristics. A number of uses for the material would be immediately apparent, particularly in the electrical and electronic fields, were it possible to incorporate a conductive layer of metal of substantial thickness on the surface of a polytetrafluoroethylene article, without resort to the use of an adhesive or electrically interfering bonding agent. An adhesive between a metal layer and the polytetrafluoroethylene base will of course produce an article with different electrical characteristics from one in which the metal is directly bonded to the polymer surface. That in itself is not undesirable, but the use of an adhesive to affect the bond introduces a variation in electrical characteristics over the surface due to variations in the continuity and thickness of the adhesive layer. Furthermore, few if any adhesives are available which are stable over the useful temperature range of polytetrafluoroethylene.

Heretofore, very thin layers of metal have been applied to the surface of polytetrafluoroethylene film either by vacuum metal deposition or by chemical reduction of a metal salt solution, and specific techniques for the application of thin metallic layers to the polymer, generally in the form of tape, are described in Croze et al. U.S. Patent No. 2,689,805 and in Kelly U.S. Patent No. 2,898,228. However these techniques are essentially limited to the treatment of polymer films and the layer of metal applied is extremely thin, only up to about one micron. The methods described are not applicable to the application of a metal layer of substantial thickness, i.e. of the order of a few mils and above, referred to herein as a massive layer.

It is well known that the surface of polytetrafluoroethylene is normally passive and non-wettable, and must be treated to enable it to be wetted by virtually any material, whether it be a metal, an adhesive, a wax or any surface marking or finishing compound. The polymer is rendered wettable by reaction at the surface with certain metals, among which are the alkali metals. Sodium is especially preferred. Activation may be accomplished through vacuum deposition of sodium metal, for example, but sodium is preferably applied from solution in an amine-type non-aqueous volatile solvent. Purvis et al. U.S. Patent No. 2,789,063 describes the following method of activating a polytetrafluoroethylene surface: Sodium metal is dissolved in liquid ammonia to the extent of about 1 to 2% by weight, and the polytetrafluoroethylene is contacted with the sodium-ammonia solution for about 10 to 30 seconds. Rappaport U.S. Patent No. 2,809,130 describes treatment with an alkali metal polyaryl hydrocarbon-solvent solution.

In its broadest aspect the method of this invention comprises a severe surface activation through treatment with a very concentrated sodium-ammonia solution for an extended period of time, a slow warming of the activated article to about room temperature, a cleaning with strong acid followed by mild surface abrasion, then sensitizing, seeding, and deposition of a thin conductive metal layer, after which the massive metal layer is electrolytically deposited in a unique manner. Several steps of the process are critical to the formation of a strong integral polymer to metal bond, and one which retains its integrity over a very wide temperature range, as will be seen from the following description of a preferred method whereby the invention is presently carried out.

Referring now to the details of the preferred process, the polytetrafluoroethylene article to which the massive metal layer is to be bonded is initially given a non-directional roughening or surface abrading treatment which exposes a larger area of the surface. Any suitable abrasion techniques may be followed, for example, abrasive blasting, vapor blasting, liquid honing, wet or dry abrasive tumbling or the article may be roughened by hand through the use of wheels, belts or brushes. The thus roughened surface is then thoroughly cleaned with a solvent to remove any grease stains, after which it is thoroughly washed with water. This preliminary roughening and cleaning assures that the surface is chemically clean, thus enabling uniform activation.

The manner in which the surface is activated is a critical factor in the preparation of a product having the requisite polymer-metal bond strength. We have found that a uniform strong bond between the metal and the polymer can be obtained only through very much more severe activation treatments than are indicated by the published prior art. The polymer surface is contacted with liquid ammonia containing sufficient dissolved sodium metal to render the solution a muddy black with no indication of a blue tint or color, and contact is maintained for a period sufficient to change the color of the normally white polymer surface to a dense brownish black.

The surface activating solution is prepared by introducing small pieces of sodium metal into liquid ammonia until the solution changes from its normal water white through a bright blue to a muddy black color. At about 1 to 2% sodium the solution is still water white, but slightly above this sodium concentration, circa 5%, the solution turns a bright blue. The desired color is a muddy black which is reached when the solution contains about 10% sodium. We preferably operate with an activating solution containing about 10% to 15% or more sodium. It is unnecessary to weigh out the metal prior to dissolving and, as indicated above, the metal may simply be slowly added in small chunks until the aforementioned muddy black color is attained. Solution color may be checked by sampling or simply by inserting and withdrawing a glass rod. Intimate contact is maintained between the solution and the surface of the article until the polymer surface assumes a dense brownish, almost sooty, black. With the aforementioned muddy black sodium-ammonia solution a minimum of 1 to 1½ minutes is required to achieve the necessary brownish black surface.

When the brownish black surface is attained, the article is removed from the ammonia solution, and warmed in air or in an atmosphere containing at least about 20% oxygen to permit completion of the reaction and oxidation of any metal complexes which may remain on the surface. This warming is preferably carried out simply by hanging the article in air for up to about 10 minutes. Of course external heat may be applied. When the article has reached approximately room temperature (65–85° F.) the reaction occurring on the surface is complete. At this time the brownish color has disappeared and the article takes on a sooty or velvety black. It is important that the article not be immersed in water immediately following removal from the sodium-ammonia solution since the metal ions inherently present in all but deionized water will tend to react with the very active surface, and we have found that quenching before the surface reaction has been completed does not enable the production of a superior metal to polymer bond.

Following warming of the article the active surface is contacted, preferably by immersion, with a strong mineral acid pickling solution, for example, concentrated nitric or hydrochloric acid or a mixture of these acids, to remove any oxidized sodium and/or metallic-appearing particles from the surface. The presence of fluoride ions or equivalent fluorine-containing anions in this acid medium is beneficial to metal-polymer bond strength, as set forth hereinafter, and may be present, for example, as hydrofluoric or fluoboric acid, or as ammonium, alkali metal or other soluble fluoride or fluoborate salt. Immersion is for a time sufficient to change the sooty black surface to a dark nut brown, which usually requires about one to two minutes. The acid also removes loose and only lightly adhering black particles from the surface leaving the aforementioned dark nut brown appearance. Continued immersion in acid will remove sufficient material from the surface to change its appearance to a light tan, and it is important that contact between the acid and the surface be suspended when the surface has changed from a dark black to a dark nut brown. We have found that this latter characteristic surface color is essential to a superior bond. The darker the surface, that is the more nearly black is the surface of the polytetrafluoroethylene the poorer the bond, and upon extended immersion in acid the surface becomes too light and the bond is not acceptably adhesive. Upon withdrawal from the acid, the article is immediately thoroughly washed with water.

The thus activated surface of the polytetrafluoroethylene article is then lightly abraded, as with pumice, to remove excess or loose carbonized particles and to achieve a substantially uniform, smooth, continuous surface. This light abrading or smoothing operation is exceedingly important to the production of a strong integral bond, and we have found that the presence of fine, loosely adhering particles on the surface definitely contributes to an inferior bond. It will be appreciated that a strong, uninterrupted and continuous bond is essential where the ultimate plated article is to be subjected to temperatures ranging from about −70° to 400° F. at various extremes of pressure.

Occasionally during this light abrading operation the dark brown surface may be penetrated at sharp edges or corners of the article, or the surface of the article may exhibit glove marks, finger prints or other minor defects or irregularities at this stage of the process. Under such circumstances the article is again briefly contacted with the sodium-ammonia solution. During this second immersion the surface does not turn brownish black but remains dark brown.

Following the second activation, or after surface smoothing, if there is no second activation, the activated surface is thoroughly rinsed with water and carefully inspected to assure that it is completely wetted. The activation treatment apparently dehalogenates the polymer at the surface. Following washing and inspection the surface is now ready for application of the metal layer.

Prior to deposition of the layer of metal from an electroforming bath, the surface of the article is first sensitized then seeded and then a thin conductive metal coating is applied. Sensitizing and seeding are well known techniques, which are clearly described in "Metallizing of Non-Conductors" by Samuel Wein (1945), Finishing Publications, Inc. For sensitizing we prefer a very dilute acidic stannous chloride solution, of the order of about 0.25 to 0.5 ounce per gallon, also containing fluoride ions as set forth below. The surface to be metallized is completely covered with this solution after which it is washed with water and then immersed in a reducing solution, for example an alkali metal hypophosphite of a concentration of about 0.5 ounce per gallon. The hypophosphite solution reduces the stannous salt to metallic tin thus preventing contamination of the seeding solution subsequently employed. The sensitized surface is then completely rinsed with water.

The article is then immersed in a very dilute solution of a seeding salt, for example gold, platinum or palladium chloride. The concentration of the seeding solution is exceedingly low, of the order of about 0.01 gram per gallon. A very thin film of palladium chloride, for example, thus covers the entire activated surface, although this film is not visible even microscopically, it being of approximately molecular thickness. The immersed part is then thoroughly rinsed with water and immersed in a reducing solution similar to that employed in the sensitizing operation. The hypophosphite reduces the palladium salts to metallic palladium and eliminates contamination of the following conductive coating solution. The reduced surface is then again thoroughly rinsed with water.

The thus seeded parts are then coated with a conductive coating of another metal, nickel, cobalt, gold, silver or copper, for example, and where possible preferably by an autocatalytic or "electroless" method.

The seeded parts are immersed in an aqueous solution containing copper or nickel ions and a small quantity of an alkali metal or ammonium hypophosphite, and depending upon temperature and concentration copper or nickel is slowly or rapidly deposited upon the seeded surface of the part.

Since the polyfluorinated ethylene polymers with which the present invention is concerned exhibit appreciable thermal expansion and contraction between about room temperature and about 212° F., and if metal of appreciable thickness is deposited at temperatures above about 165° F., which temperatures are generally required in the deposition of copper, cobalt or nickel, and the article is then removed from a hot autocatalytic bath, for example, and immersed in cool water or simply allowed to cool to room temperature contraction of the polymer will cause a deposited metal plate of say 0.5 mil thickness to become irregular and wrinkled. Accordingly, the autocatalytic deposition of conducting metal is carried out very slowly and metal is allowed to deposit only until the seeded surface has been completely covered. Deposition is carefully controlled and immediately stopped when the seeded surface has assumed a uniform color according to the color of the conducting metal being deposited. When a uniform color has been achieved, conducting metal has been deposited uniformly over the seeded surface to a thickness of only a fraction of a mil. The thickness of this plate has not been accurately determined, but is believed to be between about 0.01 and 0.05 mil. It is sufficient to say that deposition of conducting metal upon the seeded surface is stopped as soon as a uniform color is achieved. When the part is subsequently cooled there are no apparent irregularities in the resulting very thin conductive metal coating.

The conductive metal coatings mentioned all enable the production of good metal to polymer bonds, but we prefer to initially deposit nickel. As compared with copper the nickel molecule is somewhat smaller and nickel produces a slightly stronger bond. Of course, when nickel is employed as the conductive metal coating and the subsequently applied plate is nickel or a similar non-polar metal an intermediate layer of copper or silver must be deposited before the final plate is electrodeposited. We have found that if high conductive electrical skin or surface effects are required, gold, silver or copper are deposited initially to about 1 mil followed by electrodeposition.

Following application of the thin conductive metal coating, the parts are thoroughly rinsed and given a dip in dilute acid containing fluoride ions, for example, 10% sulfuric or 10% hydrochloric acid or 10% fluoroboric acid or mixtures, after which they are thoroughly rinsed with water and immersed in an electroforming bath. Most of the applications of the novel product of the present invention to date have been in the electrical and electronic fields, with the massive metal plate applied to the polytetrafluoroethylene being nickel. While the invention is not limited to the application of a nickel plate, for the sake of simplicity it will be further described with reference to a nickel plate.

We have found that the presence of fluoride ions or equivalent fluorine-containing anions, referred to simply as active fluoride ions, in the acidic media with which the surface-activated polymer is treated, from the initial acid wash through the conductive metal coating bath, results in an improved metal to polymer bond, as compared with results obtained when the process is carried out in the absence of such ions. This advantage is apparently due to reaction of the fluoride ions with insoluble metal salts undesirably present on the polymer surface, rendering the contaminating metals soluble in the acid medium. The undesirable metal ions may be introduced through the tap water normally employed in the process or as a constituent or byproduct of one of the reducing agents employed in sensitizing, seeding and application of the conducting metal coating. These metal ions are spongy and are disposed over the polymer surface. Unless rendered harmless through reaction with fluoride ions, they interfere with the results desired in sensitizing, seeding, etc., through reaction with the salts of the solutions employed. Accordingly, all of the acidic solutions up to the electroforming baths from which the massive plate is deposited desirably contain fluoride ions.

By reason of the high coefficient of thermal expansion of polytetrafluoroethylene, significant changes in the normal electroforming bath and process are necessary to assure a strong integral bond between the plated metal and the polymer over a wide range of temperature. This is particularly important where the use of the ultimate product requires a sound bond at temperatures of the order of −70° F. and below up to 400° F. Accordingly, because of the significant thermal expansion of polytetrafluoroethylene between room temperature and about 165° F., electroforming is carried out in two stages.

In the first, the temperature of the electroforming bath is drastically reduced and metal is deposited at temperatures below about 80° F., preferably between about 50 and 80° F. The plating of nickel, which is usually done at about 160° F., at 50–80° F. requires significant modification of a conventional nickel electroforming bath. For example, it must now contain a greater than normal quantity of acid, less than the normal amount of nickel ions, and the plating current density may only be about ⅓ of normal. The example, hereinafter, sets forth a typical electroforming bath for depositing nickel at temperatures between about 50 and 80° F.

Plating is continued at the low temperature until a sufficiently thick nickel plate has been deposited to restrain expansion of the polymer when its temperature is raised to about 165° F. and above. Where only one surface of the article is being plated, initial deposition from the electroforming bath is to a thickness sufficient to somewhat restrain movement of elements of the adjacent surface of the polymer when its temperature is raised.

This initial deposition from the electroforming bath is to a thickness of at least 5 to 20 mils, preferably to between about 15 and 20 mils. For example, we have found that about 15–20 mils is sufficient to adequately restrain a 10 inch polymer piece with uniform cross section of 1 x ½ inch. Of course, when the mass of the polymer being plated is very great, as much as 100 mils may be required to attain the above objective, and vice versa.

When the initial plate has reached restraining thickness, the concentrations of the plating bath are altered and its temperature raised to normal nickel plating ranges and electroforming is continued at a more rapid rate. Of course the article may be removed to a second nickel bath of higher concentration for the second electroforming operation. During the second deposition the plate tends to build up at the edges of the article and it may be necessary to remove the article from the bath and grind the surface, after which it is activated with acid, given a nickel chloride strike or very thin copper plate and returned to the nickel bath. These are techniques generally followed in electroforming.

Thus is can be seen that the present process differs in many respects from that employed to activate a very thin film of polytetrafluoroethylene, and to apply a comparatively thin metal layer thereto. For example, in order to produce a sound integral bond between a polytetrafluoroethylene article of substantial mass, rigidity, and thickness, as compared with a film, and a massive or thick metal layer, the activation of the surface of the polymer is exceedingly important. Where only slight activation of the surface is required to retain a vacuum deposited or reduced metal layer of approximately micron thickness, very substantial and deep activation of the surface is required to support a massive layer of metal many thousand times thicker. As just noted, electroforming differs appreciably from conventional techniques.

The following typical example illustrates the process of the invention as presently practiced, and typical solutions and baths which may be employed:

A shaped piece of sintered Teflon approximately 0.4 x 0.9 x 10 inches was carried through the following steps to produce a section of nickel plated wave guide tube. The piece was first abraded on all surfaces with 200 mesh alumina and then cleaned with a chlorinated solvent to remove any grease film. It was then immersed in 10% HF to remove all adhering alumina, rinsed with water and dried. The clean abraded piece was then immersed in liquid ammonia containing 10% dissolved sodium for approximately 1 minute, withdrawn and suspended in air to complete oxidation of any metallic film. Following this treatment all surfaces of the piece were a brownish black.

The thus activated piece was next immersed in an acid pickle consisting of 10% hydrochloric acid, 10% fluoboric acid and 6 oz./gal. of ammonium bifluoride to remove byproducts obtained during dehalogenation of the surfaces. It was allowed to remain in the pickle until the surfaces assumed a dark nut brown and were completely wetted by water in a subsequent rinse. The surfaces were then sensitized by immersion for 3 to 5 minutes in an agitated solution containing per liter of water:

10 g. stannous chloride
    20 cc. hydrochloric acid
    20 cc. hydrofluoric acid The piece was then thoroughly rinsed with water and immersed in a solution of 10 g. sodium hypophosphite in a liter of water for about 1 minute to reduce remaining tin salt to metallic tin, after which it was again water washed.

Seeding was accomplished by immersion for about 1 minute in a solution containing per liter:

0.1 to 1 g. palladium chloride
    5 cc. hydrochloric acid
    5 cc. hydrofluoric acid It was then thoroughly washed with water and the palladium chloride remaining on the surfaces reduced by immersion for 1 minute in a solution containing 25 g. sodium hypophosphite per liter of water. Following another thorough water rinse the piece was placed in an "electroless" nickel solution constituted as follows:

30 g. nickel fluoride
    10 g. sodium hypophosphite
    50 g. sodium hydroxyacetate
    1000 cc. water, and sufficient sodium hydroxide to pH 4.0–6.0.

The piece was allowed to remain in the nickel solution only sufficiently long to enable complete nickel coverage, for example for about 5 minutes during which at most about 0.001 mil of nickel is deposited. In place of nickel a copper, silver or cobalt bath might have been employed.

The piece was then again thoroughly rinsed with water at about 50–55° F., and then immersed in the aforementioned pickling bath at about the same temperature to remove by products of the "electroless" nickel reduction, such as phosphorus salts, and to activate any passivity of the nickel which may have occurred while at 50–55° F. It is then again rinsed and immersed in the following aqueous acidic copper plating bath:

28 oz./gal. copper sulfate
    7 oz./gal. sulfuric acid

Plating was at a current density of about 15–20 amps./ft.$^2$ for 30 minutes, with the bath maintained at 50–55° F.

The piece being plated was required to pass certain electrical tests and the copper plate assures a highly conductive inner surface. The thickness of the copper plate was 0.5 to 1 mil.

Following another rinse the piece was removed to a first nickel electroforming bath containing:

20 oz./gal. nickel sulfamate
    4 oz./gal. nickel chloride
    6 oz./gal. boric acid This first bath was maintained at 50–60° F. to keep the Teflon within dimensional tolerances. Plating was at a current density of 5 to 10 amps./ft.$^2$ to a nickel plate thickness of 0.015 in. after about 18 hours. At this point some light polishing was done to remove roughness and built-up edges. The nickel surface was activated in the aforementioned acid pickling bath, washed with water and given a copper strike. The piece was again dipped in the pickle, washed and immersed in a second nickel electroforming bath containing:

44–60 oz./gal. nickel sulfamate
    4 oz./gal. nickel chloride
    4 oz./gal. boric acid (pH 3.5–4.2)

The final build-up of nickel was at a current density of about 20–25 amps./ft.$^2$ and bath temperature of about 110–120° F., to a thickness of about 0.065 in.

The thus plated Teflon was then machined to a plate thickness of 0.050 in., and the resulting cross-sectional dimensions were 0.5 x 1.0 in.

A standard 40 A.U. X-band flange was soldered to one end of the plated piece, and the flange attached to an air pressure testing device. A pressure of 15 p.s.i.g. was then applied at the flange for a period of six hours without loss of pressure through the metal-Teflon bond. The bond of the piece tested was substantially better than actually required, since a pressure loss of up to 0.5 p.s.i. in the six hour period indicates an acceptable bond. An electrical test for standing wave ratio was then made.

The piece was then subjected to extremes of temperature as follows: Starting at room conditions, the temperature was reduced to −60° F. in 2 hours, then raised to 32° F. in 2 hours, then further raised to 425° F. in 5 minutes, after which it was cooled to room temperature in 5 minutes. This cycle was repeated three times after which the piece again passed the pressure and electrical tests. No pressure was lost indicating no damage to the metal-Teflon bond, and there was no change in electrical characteristics.

Thus it can be seen that the product of the present invention is characterized by an extremely sound and stable bond between the massive metal layer and the polymer. This bond is at least sufficient to withstand the aforementioned 15 p.s.i.g. for 6 hours without loss. In some instances the bond has withstood 90 p.s.i.g. for several hours and also as much as 600 p.s.i. for short periods.

While the pressure test is a preferred indicator of bond strength for articles to be used in the electrical and electronic arts, another criterion of bond strength is the force required to remove a metal plate of given width and thickness from the polymer surface. The following pull test clearly shows the very substantial strength of the bond.

A piece of polyfluorinated polymer two inches square and $\frac{1}{16}$ in. thick is activated and plated in accordance with the process of this invention with copper or nickel to a thickness of 3 to 5 mils. The plate was then cut through to define a one inch wide strip across the polymer piece, the plate peeled from the surface at the edge to enable grasping, and then stripped from the polymer by pulling at right angles to the surface. The pull required was always at least about 10 pounds for the one inch width and in most instances between about 18 and 20 pounds. As a comparison, an equivalent strip of copper bonded to brass with eutectic solder can be stripped from the brass in the same manner with only 4 to 5 pounds pull.

The metal to polymer bond has been found to increase in strength appreciably with the passage of time. In some instances bond integrity doubles in about 30 days as determined by the pull test, although the mechanism of this age strengthening is not yet full understood.

We claim:

1. A process for bonding a massive layer of metal to the surface of a polytetrafluoroethylene article, which comprises contacting the polymer surface to be metallized with liquid ammonia having dissolved therein at least about 10% by weight sodium metal, maintaining said contact for a time sufficient to change the normal white polymer surface to a dense brownish black, then raising the temperature of the thus treated surface to about room temperature in the presence of air, contacting the surface with a strong mineral acid also containing active fluoride ions for a time sufficient to change the surface color to a dark nut brown, sensitizing the surface, seeding a metal onto the surface, depositing a conductive metal coating onto the seeded surface in amount sufficient to impart a uniform conductive metal color to the surface, electrodepositing a metal onto the conductive metal surface, first at a temperature below about 80° F. to a thickness of deposited metal sufficient to withstand expansion of the polymer at about 165° F., and then at a temperature above about 110° F. to the desired thickness.

2. A process for direct hermetic bonding of a metal layer to the surface of a polyfluorinated ethylene polymer, which comprises contacting the polymer surface to be metallized with liquid ammonia containing dissolved alkali metal in an amount sufficient to render the solution a muddy black color, maintaining said contact for a time sufficient to change the normal white polymer surface to a dense brownish black, removing said surface from the ammonia solution while maintaining said surface substantially free from contact with water, exposing said surface to an oxygen-containing atmosphere to complete activation of said polymer surface and to oxidize any metal complexes thereon, then contacting the surface with a strong mineral acid to remove any oxidized metal particles on said surface for a time sufficient to change the surface color to a dark nut brown, sensitizing the surface, seeding a metal onto the surface in an amount sufficient to impart a uniform conductive metal color to the surface, electrodepositing a metal capable of electrodeposition onto the conductive metal surface, first at a temperature below about 80° F. to a thickness of deposited metal sufficient to withstand expansion of the polymer at about 165° F. and then at a temperature above about 110° F. to the desired thickness.

3. The process as defined in claim 2 wherein said alkali metal is sodium and the amount of dissolved alkali metal is at least 10% by weight of said sodium, and wherein said strong mineral acid contains acid fluoride ions and wherein further said metal being electrodeposited is nickel and said second electro-depositing step occurs at normal nickel plating temperatures above about 110° F.

4. As an article of manufacture, a polyfluorinated ethylene polymer-metal product comprising a polytetrafluoroethylene base member having a highly activated surface and a massive layer of metal bonded to said polymer base member, said metal layer being of at least one mil thickness and having the surface of said metal layer contiguous with said activated polymer surface directly and hermetically bonded thereto, the bond between the polymer and the layer of metal being capable of withstanding air pressure of 15 p.s.i.g. for up to six hours without a loss of pressure exceeding 0.5 p.s.i.

5. A polyfluorinated ethylene polymer-metal article comprising a polyfluorinated ethylene polymer base member and a massive layer of metal having substantial thickness of at least one mil bonded to said member and having the surface of said metal member contiguous with said polymer base member directly and hermetically bonded to the contiguous surface of said base member, the direct bond between the polymer surface and the metal layer being of strength such that a pulling force in excess of 10 pounds per inch of width of said metal layer applied at right angles to the polymer surface is required to peel a 3 to 5 mil thick layer of said metal from said polymer base member.

6. An article as set forth in claim 5 wherein the polymer is polytetrafluoroethylene.

References Cited in the file of this patent

UNITED STATES PATENTS

| | | |
|---|---|---|
| 2,214,646 | Walker | Sept. 10, 1940 |
| 2,436,690 | Du Rose | Feb. 24, 1948 |
| 2,454,610 | Narcus | Nov. 23, 1948 |
| 2,576,922 | Camin et al. | Dec. 4, 1951 |
| 2,690,402 | Crehan | Sept. 28, 1954 |
| 2,801,447 | Wolinski | Aug. 6, 1957 |
| 2,898,228 | Kelley | Aug. 4, 1959 |
| 2,923,651 | Petriello | Feb. 2, 1960 |

OTHER REFERENCES

Wein, S.: "Metallizing of Non-Conductors" (1945), Finishing Pub., Inc., pp. 24–29 relied upon.